United States Patent
Nakaho

(10) Patent No.: US 7,327,509 B2
(45) Date of Patent: Feb. 5, 2008

(54) ELECTROCHROMIC MIRROR

(75) Inventor: Junichi Nakaho, Aichi-ken (JP)

(73) Assignee: Kabushiki Kaisha Tokai-Rika-Denki-Seisakusho, Aichi-ken (JP)

( * ) Notice: Subject to any disclaimer, the term of this patent is extended or adjusted under 35 U.S.C. 154(b) by 51 days.

(21) Appl. No.: 11/113,304

(22) Filed: Apr. 25, 2005

(65) Prior Publication Data

US 2005/0237595 A1    Oct. 27, 2005

(30) Foreign Application Priority Data

Apr. 26, 2004   (JP) .............................. 2004-129666

(51) Int. Cl.
*G02F 1/15* (2006.01)
*G02F 1/153* (2006.01)

(52) U.S. Cl. .................. 359/265; 359/266; 359/267; 359/272

(58) Field of Classification Search ........ 359/265–274, 359/601, 604, 839
See application file for complete search history.

(56) References Cited

U.S. PATENT DOCUMENTS

| | | | | |
|---|---|---|---|---|
| 3,807,832 A | | 4/1974 | Castellion .................. 359/267 |
| 3,844,636 A | * | 10/1974 | Maricle et al. ............. 359/267 |
| 4,465,339 A | * | 8/1984 | Baucke et al. .............. 359/274 |
| 6,563,625 B1 | | 5/2003 | Athenstaedt et al. ........ 359/265 |

FOREIGN PATENT DOCUMENTS

| | | |
|---|---|---|
| DE | 3516021 A1 | 11/1986 |
| EP | 0 035 766 A1 | 9/1981 |
| EP | 1 488 957 A1 | 12/2004 |
| JP | 2672083 | 7/1997 |

OTHER PUBLICATIONS

European Search Report dated Jul. 27, 2005 in corresponding European Patent Application No. EP 05 00 8991.

* cited by examiner

*Primary Examiner*—M. Hasan
(74) *Attorney, Agent, or Firm*—Roberts, Mlotkowski & Hobbes; Thomas W. Cole

(57) ABSTRACT

The present invention provides an electrochromic mirror, comprising a transparent substrate; an electrochromic film that develops color reductively having the transparent substrate on or above the surface thereof; a light-reflecting film allowing transmission of hydrogen or lithium atoms formed on the side of the electrochromic film opposite to the transparent substrate; a substrate having an electrically conductive area at least on one surface facing the light-reflecting film; and an electrolyte solution at least containing a hydrogen ion and an oxidizable material containing neutral molecules or negative ions and that is sealed between the light-reflecting film and the conductive area of the substrate; wherein (i) the light-reflecting film has electrical conductivity, or (ii) a transparent electrode film having electrical conductivity is formed between the transparent substrate and the electrochromic film, further comprising a dielectric film having a hydrogen or lithium ion conductivity formed between the light-reflecting film and the electrolyte solution.

11 Claims, 2 Drawing Sheets

ELECTROCHROMIC MIRROR

CROSS-REFERENCE TO RELATED APPLICATION

This application claims priority under 35 USC 119 from Japanese Patent Application No, 2004-129666, the disclosure of which is incorporated by reference herein.

BACKGROUND OF THE INVENTION

1. Field of Invention

The present invention relates to an interior or exterior rear mirror applicable for use in vehicles such as automobiles and particularly an electrochromic mirror that changes its reflectance with an applied voltage.

2. Description of the Related Art

Electrochromic mirrors that change their colors in a coloring reaction of a so-called "electrochromic solution", a solution that changes its color electrically, are conventionally known (e.g., Japanese Patent No. 2672083).

Japanese Patent No. 2672083 teaches an electrochromic mirror which disposes two glass substrates in parallel with each other at a certain distance. Two transparent electrode films are respectively formed on internal surfaces of these two glass substrates which face each other. A space between the transparent electrode films is sealed with a sealant to form a cell structure. An electrochromic solution is contained in the cell. In addition, a light-reflecting film and a protective coating film are formed on a face of the glass substrate that is disposed on the opposite to the side on which light is incident.

When a voltage is applied between the respective transparent electrode films by a power supply unit in the electrochromic mirror, the reflectance of the mirror changes in a coloring reaction of the electrochromic solution.

However, in such an electrochromic mirror, if the two glass substrates are not bonded via a sealant in parallel to each other at high accuracy, images formed by the following do not coincide with each other: light which is reflected by the light-reflecting film, formed on the rear face of the glass substrate disposed on the opposite side to the side on which incident light applied; and light which is reflected by the front surface of the glass substrate which is placed on the same side as the side on which light is incident. In this case, a so-called double image is generated providing a mirror with poor visibility. Such electrochromic mirrors have the disadvantage that it is difficult and costly to manufacture them so that they do not cause the above-described phenomenon, in particular when the electrochromic mirrors are used for automobiles, which generally employ curved mirrors.

In view of overcoming these problems, an electrochromic mirror having a light-reflecting film formed on a rear face of a front glass substrate (light-entering substrate) has been proposed.

As shown in FIG. 4, the electrochromic mirror 100 has an electrochromic film 104 of tungsten trioxide ($WO_3$) that develops color reductively formed on a rear face of the glass substrate 102 that is disposed on the same side as the side on which light is incident (the top in FIG. 4). A light-reflecting film 106, that is formed of rhodium or the like, is additionally superimposed on the electrochromic film 104. Further, an electrode film 110 is formed on a surface face (side of light-reflecting film 106) of a glass substrate 108 that is disposed on the opposite side to the incident light. An electrolyte solution 112 containing hydrogen ions is sealed in the space between the light-reflecting film 106 and the electrode film 110.

When a voltage is applied between the light-reflecting film 106 and the electrode film 110, the hydrogen ions in the electrolyte solution 112 are converted at the light-reflecting film 106 to hydrogen atoms, which diffuse through the light-reflecting film 106 to the electrochromic film 104, coloring the electrochromic film 104.

As a result, the light that enters into the glass substrate 102 and is reflected by the light-reflecting film 106 (see arrow A in FIG. 4) is reduced in intensity by passing through the colored color layer, altering the reflectance of the variable reflectance mirror. In addition, since the light that enters into the glass substrate 102 is reflected by the light-reflecting film 106 formed on the rear face of the glass substrate 102, generation of a double image is prevented.

As shown in FIG. 4, the light-reflecting film 106 is in contact with the electrolyte solution 112 in the electrochromic mirror 100 having the above configuration. Because a highly reactive liquid is generally used as the electrolyte solution 112, the light-reflecting film 106 may be corroded by the electrolyte solution 112.

SUMMARY OF THE INVENTION

In consideration of the circumstances above, the present invention provides an electrochromic mirror allowing prevention of the corrosion of the light-reflecting film by the electrolyte solution.

Namely, the invention provides an electrochromic mirror, having a transparent substrate; an electrochromic film, that reductively develops color, and has the transparent substrate on or above a surface thereof; a light-reflecting film, that allows transmission of hydrogen atoms or lithium atoms, and is formed on a side of the electrochromic film that is opposite to a side provided with the transparent substrate; a substrate having an electrically conductive area on at least one surface that faces the light-reflecting film; and an electrolyte solution that comprises hydrogen ions and an oxidizable material containing neutral molecules or negative ions and that is sealed between the light-reflecting film and the conductive area of the substrate, wherein (i) the light-reflecting film has electrical conductivity, or, (ii) a transparent electrode film having electrical conductivity is formed between the transparent substrate and the electrochromic film, further comprising a dielectric film that has hydrogen ion conductivity or lithium ion conductivity and is formed between the light-reflecting film and the electrolyte solution.

BRIEF DESCRIPTION OF THE DRAWINGS

Preferable embodiments of the present invention will be described in detail based on the following figures.

DETAILED DESCRIPTION OF THE INVENTION

Figure 1:
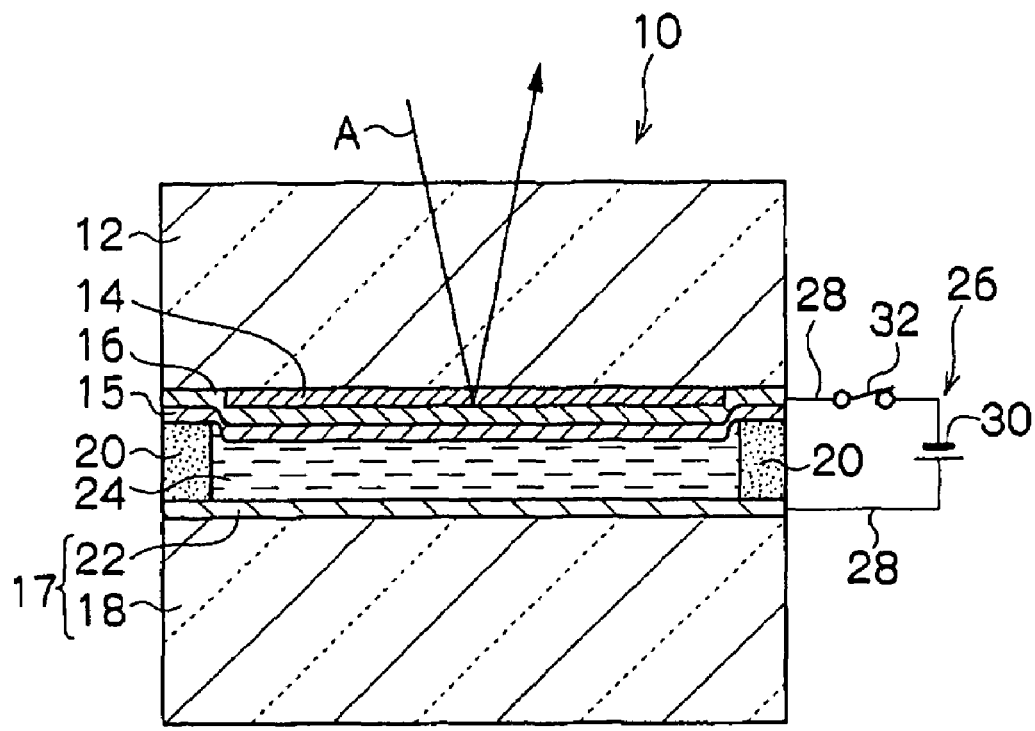
FIG. 1 is a cross-sectional view illustrating the configuration of an electrochromic mirror according to the first embodiment of the invention.

Hereinafter, the electrochromic mirror according to the present invention will be described in detail.

The electrochromic mirror of the present invention is an electrochromic mirror that has a transparent substrate; an electrochromic film, that reductively develops color, and has the transparent substrate on or above a surface thereof; a light-reflecting film, that allows transmission of hydrogen atoms or lithium atoms, and is formed on a side of the electrochromic film that is opposite to a side provided with the transparent substrate; a substrate having an electrically conductive area on at least one surface that faces the light-reflecting film; and an electrolyte solution that comprises hydrogen ions and an oxidizable material containing neutral molecules or negative ions and that is sealed between the light-reflecting film and the conductive area of the substrate, wherein (i) the light-reflecting film has electrical conductivity, or, (ii) a transparent electrode film having electrical conductivity is formed between the transparent substrate and the electrochromic film, further comprising a dielectric film that has hydrogen ion conductivity or lithium ion conductivity and is formed between the light-reflecting film and the electrolyte solution.

Specifically, a first aspect of the invention is an electrochromic mirror that has at least a transparent substrate, having an electrochromic film that reductively develops color formed on or above a surface thereof a light-reflecting film allowing transmission of hydrogen atoms and having electrical conductivity superimposed on the electrochromic film, a substrate having an electrically conductive area on at least one surface facing the conductive light-reflecting film, and which is placed close to the transparent substrate, an electrolyte solution that contains at least a hydrogen ion and an oxidizable material containing neutral molecules or negative ions and that is sealed in a space between the conductive light-reflecting film of the transparent substrate and the conductive area of the substrate, and a hydrogen ion-conductive dielectric film having hydrogen ion conductivity, formed between the conductive light-reflecting film and the electrolyte solution.

When a negative voltage is applied to the conductive light-reflecting film of the transparent substrate and a positive voltage is applied to the conductive area of the substrate, the hydrogen ions contained in the electrolyte solution penetrate through the hydrogen ion-conductive dielectric film and then through the conductive light-reflecting film as hydrogen atoms to the electrochromic film. As a result, the following reductive reaction occurs in the electrochromic film.

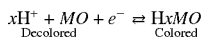
$$x\text{H}^+ + MO + e^- \rightleftarrows \text{H}xMO$$
Decolored  Colored In the above reaction equation, H⁺ represents a hydrogen ion; MO represents the material for an electrochromic film; and e⁻ represents an electron. Examples of the materials (MO) used for the electrochromic film include tungsten trioxide ($WO_3$), molybdenum trioxide ($MoO_3$), and mixtures containing at least one of them.

Since the electrolyte solution contains an oxidizable material containing neutral molecules or negative ions, the reductive reaction of the electrochromic film described above is assured.

That is, if an oxidizable neutral molecule (say, A) is present in the electrolyte solution, the following oxidation reaction occurs in the electrolyte solution in the vicinity of the conductive area of the substrate to which a positive voltage is applied.

$$A - e^- \rightleftarrows A^+$$

Alternatively, if an oxidizable negative ion (say, B) is present in the electrolyte solution, the following oxidation reaction occurs in the electrolyte solution in the vicinity of the conductive area of the substrate to which a positive voltage is applied.

$$B^- - e^- \rightleftarrows B$$

Thus, for example, when the material used for the electrochromic film is tungsten trioxide and the electrolyte solution contains an oxidizable neutral molecule, the overall reaction is expressed in the following equation.

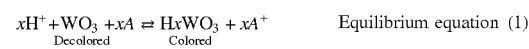
$$\underset{\text{Decolored}}{x\text{H}^+ + WO_3 + xA} \rightleftarrows \underset{\text{Colored}}{\text{H}xWO_3 + xA^+} \quad \text{Equilibrium equation (1)}$$

Alternatively, for example, when the material used for the electrochromic film is tungsten trioxide and the electrolyte solution contains an oxidizable negative ion, the overall reaction is expressed in the following equation.

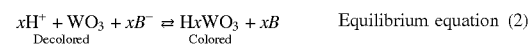
$$\underset{\text{Decolored}}{x\text{H}^+ + WO_3 + xB^-} \rightleftarrows \underset{\text{Colored}}{\text{H}xWO_3 + xB} \quad \text{Equilibrium equation (2)}$$

In the above equation reaction, electrochromic film develops color reductively. (A negative ion is contained in the electrolyte solution for alignment of each of the equilibrium equations (1) and (2). In addition, the electrolyte solution might not be colored by the reaction in the electrolyte solution.)

Accordingly, the light that enters into transparent substrate from the front surface of the transparent substrate (the side opposite to that on which the electrochromic film, conductive light-reflecting film, and hydrogen ion-conductive dielectric film are formed) and is reflected by the conductive light-reflecting film with reduced intensity by passing through the colored electrochromic film, resulting in change in the reflectance of the electrochromic mirror, and providing an anti-glare effect.

In the electrochromic mirror according to the first embodiment of the invention, a hydrogen ion conductive dielectric film is formed between the conductive light-reflecting film and the electrolyte solution. Contact between the conductive light-reflecting film and the electrolyte solution is prevented by the hydrogen ion conductive dielectric film. In this manner, corrosion of the conductive light-reflecting film by the electrolyte solution is prevented.

The electrochromic mirror according to a second aspect of the invention is an electrochromic mirror, having a transparent substrate having a transparent electrode film having electrical conductivity formed on the surface opposite to the light incident surface, an electrochromic film that develops color reductively superimposed on the transparent electrode film, and a light-reflecting film allowing transmission of hydrogen atoms superimposed on the electrochromic film; a substrate having an electrically conductive area on at least one surface facing the light-reflecting film, and which is placed in the vicinity of the transparent substrate; an electrolyte solution containing at least hydrogen ions and an oxidizable material containing neutral molecules or negative ions, which is sealed between the light-reflecting film of the transparent substrate and the conductive area of the substrate; and a hydrogen ion conductivity processing dielectric film having a hydrogen ion conductivity formed between the light-reflecting film and the electrolyte solution.

In the electrochromic mirror according to the second embodiment of the invention, when a negative voltage is applied to the transparent electrode film of the transparent substrate and a positive voltage is applied to the conductive area of the substrate, hydrogen ions contained in the electrolyte solution penetrate through the hydrogen ion conductive dielectric film, and then through the light-reflecting film as hydrogen atoms, to the electrochromic film. Thus, in a similar manner to the electrochromic mirror according to the first embodiment of the invention, the electrochromic film develops color reductively, changing the reflectance of the electrochromic mirror.

In the electrochromic mirror according to the second embodiment of the invention, a hydrogen ion conductive dielectric film is formed between the light-reflecting film and the electrolyte solution. Contact between the light-reflecting film and the electrolyte solution is prevented by the hydrogen ion-conductive dielectric film. In this manner, corrosion of the conductive light-reflecting film by the electrolyte solution is prevented.

In the electrochromic mirror according to the first or second embodiment of the invention, the hydrogen ion conductive dielectric film preferably contains at least one compound selected from the group consisting of silicon dioxide ($SiO_2$), magnesium fluoride ($MgF_2$), and tantalum pentoxide ($Ta_2O_5$).

In addition, the electrochromic mirror according to a third aspect of the invention is an electrochromic mirror, having a transparent substrate having an electrochromic film that develops color reductively formed on or above the side opposite to the incident light and a conductive light-reflecting film allowing transmission of lithium ions and having electrical conductivity superimposed on the electrochromic film; a substrate having an electrically conductive area on at least one surface facing the conductive light-reflecting film, and which is placed in the vicinity of the transparent substrate; and an electrolyte solution containing at least lithium ions and an oxidizable material containing neutral molecules or negative ions, which is sealed between the conductive light-reflecting film of the transparent substrate and the conductive area of the substrate; and a lithium ion-conductive dielectric film having lithium ion conductivity, which is placed between the conductive light-reflecting film and the electrolyte solution.

In the electrochromic mirror according to the third aspect of the invention, when a negative voltage is applied to the conductive light-reflecting film of the transparent substrate and a positive voltage to the conductive area of the substrate, lithium ions contained in the electrolyte solution penetrate through the lithium ion-conductive dielectric film, and then through the conductive light-reflecting film as lithium atoms, to the electrochromic film. As a result, the following reductive reaction occurs at the electrochromic film.

$$xLi^+ + MO + e^- \rightleftharpoons Li_xMO$$
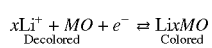

$Li^+$ represents a lithium ion, MO represents a material for the electrochromic film, $e^-$ represents an electron. Preferable examples of the material used for forming the electrochromic film (MO) include at least one selected from the group consisting of tungsten trioxide ($WO_3$), molybdenum trioxide ($MoO_3$), and mixtures containing at least one of these.

On the other hand, since the electrolyte solution contains an oxidizable material containing neutral molecules or negative ions, the reductive reaction of the electrochromic film described above is assured.

Namely, when the electrolyte solution contains an oxidizable neutral molecule (A), the following oxidation reaction occurs in the electrolyte solution in the vicinity of the conductive area of the substrate to which a positive voltage is applied.

$$A - e^- \rightleftharpoons A^+ \quad \text{Equilibrium equation}$$

Alternatively, when the electrolyte solution contains an oxidizable negative ion (B), the following oxidation reaction occurs in the electrolyte solution in the vicinity of the conductive area of the substrate to which a positive voltage is applied.

$$B^- - e^- \rightleftharpoons B$$

Thus, for example, when the material used for the electrochromic film is made of tungsten trioxide and the electrolyte solution contains an oxidizable neutral molecule, the total reaction can be expressed in the following equation.

$$xLi^+ + WO_3 + xA \rightleftharpoons Li_xWO_3 + xA^+ \quad \text{Equilibrium equation (3)}$$
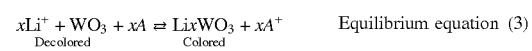

Alternatively, for example, when the material used for the electrochromic film is made of tungsten trioxide and the electrolyte solution contains an oxidizable negative ion, the total reaction can be expressed in the following equation.

$$xLi^+ + WO_3 + xB^- \rightleftharpoons Li_xWO_3 + xB \quad \text{Equilibrium equation (4)}$$
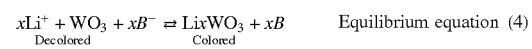

Thus, the electrochromic film develops color reductively. (A negative ion is contained in the electrolyte solution for alignment of each of the equilibrium equations (3) and (4). In addition, the electrolyte solution might not be colored by the reaction in the electrolyte solution.)

As a result, the light that enters the transparent substrate from the incident light surface of the transparent substrate (side opposite to that on which the electrochromic film, conductive light-reflecting film, and lithium ion-conductive dielectric film are formed) and is reflected by the conductive light-reflecting film is reduced in intensity by passing through the colored electrochromic film, resulting in change in the reflectance of the electrochromic mirror and providing an anti-glare effect.

In the electrochromic mirror according to the third aspect of the invention, a lithium ion conductive dielectric film is formed between the conductive light-reflecting film and the electrolyte solution. Accordingly, contact between the conductive light-reflecting film and the electrolyte solution is prevented by the lithium ion conductive dielectric film. In this manner, corrosion of the conductive light-reflecting film by the electrolyte solution is prevented.

The electrochromic mirror according to a fourth aspect of the invention is an electrochromic mirror, having a transparent substrate having a transparent electrode film having electrical conductivity formed on or above the surface opposite to the incident light, an electrochromic film that develops color reductively superimposed on the transparent electrode film and a light-reflecting film allowing permeation of lithium atoms superimposed on the electrochromic film; a substrate having an electrically conductive area on at least one surface facing the light-reflecting layer, and which is placed in the vicinity of the transparent substrate; an electrolyte solution containing at least lithium ions and an oxidizable material containing neutral molecules or negative ions, which is sealed between the light-reflecting film of the transparent substrate and the conductive area of the substrate; and a lithium ion-conductive dielectric film having lithium ion conductivity, which is placed between the conductive light-reflecting film and the electrolyte solution.

In the electrochronic mirror according to the fourth aspect of the invention, when a negative voltage is applied to the transparent electrode film of transparent substrate and a positive voltage is applied to the conductive area of the substrate, lithium ions contained in the electrolyte solution penetrate through the lithium ion-conductive dielectric film, and then through the light-reflecting film as lithium atoms, to the electrochromic film. Thus, in a similar manner to the electrochromic mirror according to the third aspect of the invention, the electrochromic film develops color reductively, changing the reflectance of the electrochromic mirror.

In the electrochromic mirror, a lithium ion-conductive dielectric film is formed between the light-reflecting film and the electrolyte solution. Accordingly, contact between the light-reflecting film and the electrolyte solution is prevented by the lithium ion-conductive dielectric film. In this manner, corrosion of the conductive light-reflecting film by the electrolyte solution is prevented.

In the electrochromic mirror according to the third or fourth aspect of the invention, the material used for the lithium ion-conductive dielectric film preferably contains at least one compound selected from the group consisting of lithium fluoride (LiF), magnesium fluoride ($MgF_2$), and aluminum lithium fluoride (LiAlF).

The electrochromic mirror according to a fifth embodiment fifth aspect of the invention is an electrochromic mirror, having a transparent substrate having an electrochromic film that develops color reductively formed on or above a surface on the side opposite the incident light, allowing transmission of hydrogen atoms, and a conductive light-reflecting film having electrical conductivity superimposed on the electrochromic film; a substrate having an electrically conductive area on at least one surface facing the conductive light-reflecting film, and which is placed in the vicinity of the transparent substrate; an electrolyte solution containing at least hydrogen ions and an oxidizable material containing neutral molecules or negative ions, which is sealed between the conductive light-reflecting film of the inventive substrate and the conductive area of the substrate; and a dielectric film having electrical and hydrogen ion conductivities, which is placed between the conductive light-reflecting film and the electrolyte solution.

In the electrochromic mirror according to the fifth aspect of the invention, the dielectric film formed between the conductive light-reflecting film and the electrolyte solution has electrical and hydrogen ion conductivities. Thus, when a negative voltage is applied to the dielectric film and a positive voltage to the conductive area of the substrate, a negative voltage is applied to the conductive light-reflecting film via the dielectric film. As a result, hydrogen ions contained in the electrolyte solution penetrate through the dielectric film, and then through the conductive light-reflecting film as hydrogen atoms, to the electrochromic film. Consequently, in a similar manner to the electrochromic mirror according to the first or second aspects of the invention, the electrochromic film develops color reductively, changing the reflectance of the electrochromic mirror.

In the electrochromic mirror, as described above, a dielectric film is formed between the conductive light-reflecting film and the electrolyte solution. Accordingly, contact between the conductive light-reflecting film and the electrolyte solution is prevented by the dielectric film. Thus, corrosion of the conductive light-reflecting film by the electrolyte solution is prevented.

In addition, in the electrochromic mirror, the dielectric film has electrical conductivity as described above. The dielectric film plays both the role of a protection film for protecting the conductive light-reflecting film from the electrolyte solution and the role of an electrode film for applying a voltage to the conductive light-reflecting film. Accordingly, even without connecting a wire to the conductive light-reflecting film formed on the inner side (facing the transparent substrate) of the protection film (dielectric film), it is possible to apply a voltage to the conductive light-reflecting film via the dielectric film. This is done by connecting a terminal or the like to the dielectric film formed on the outside (facing the electrolyte solution) of the conductive light-reflecting film and applying a voltage thereto. Thus, the electrochromic mirror has a more simplified structure.

In the electrochromic mirror according to the fifth aspect of the invention, the material used for the dielectric film preferably contains at least one compound selected from the group consisting of tin oxide ($SnO_2$), fluorine-doped tin oxide ($SnO_2$:F), antimony-doped tin oxide ($SnO_2$:Sb), tin-doped indium oxide (ITO), zinc oxide (ZnO), aluminum-doped zinc oxide (ZnO:Al), titanium oxide ($TiO_2$), and titanium nitride (TiN).

As described above, the electrochromic mirror according to the invention prevents corrosion of the light-reflecting film by the electrolyte solution.

EXAMPLES

Example 1

FIG. 1 is a cross-sectional view illustrating the configuration of an electrochromic mirror 10 according to the first embodiment of the invention.

The electrochromic mirror 10 has a glass substrate 12 as its transparent substrate. The glass substrate 12 has an electrochromic film 14 that develops color reductively formed on the rear face (bottom surface in FIG. 1) by, for example, means of vacuum deposition in the form of a thin film. The material used for the electrochromic film 14 in the first embodiment is tungsten trioxide ($WO_3$).

On the side of electrochromic film 14 opposite to the glass substrate 12, a conductive light-reflecting film 16 allowing transmission of hydrogen atoms and having electrical conductivity is formed as a thin film, for example, by means of vacuum deposition. Use of a noble metal in the platinum family such as platinum, rhodium, or palladium, alloys containing the same (e.g., an alloy of silver and an element in platinum family), or the like as the material used for the conductive light-reflecting film 16 is preferable.

On the side of the conductive light-reflecting film 16 opposite to the glass substrate 12, an ion conductive dielectric film 15 having hydrogen ion conductivity is formed as a thin film by means, for example, of vacuum deposition.

Silicon dioxide ($SiO_2$), magnesium fluoride ($MgF_2$), tantalum pentoxide ($Ta_2O_5$), or the like may be preferably used as the material used for the hydrogen ion-conductive dielectric film 15.

In addition, a substrate 17 is formed close to the rear face of the glass substrate 12. The substrate 17 has a glass substrate 18 and an electrode film 22, a conductive area formed on one surface of the glass substrate 18 as a thin film, for example by means of vacuum deposition; and the edge region of the electrode film 22 is connected to the hydrogen ion-conductive dielectric film 15 via a sealant 20, in such a manner that the surface of the electrode film 22 faces the conductive light-reflecting film 16. The material used for the electrode film 22 in the first embodiment is a metal such as chromium.

A space (cell structure) sealed by the sealant 20, which is formed between the conductive light-reflecting film 16 of glass substrate 12 and the electrode film 22 of substrate 17, contains an electrolyte solution 24. In the first embodiment, the electrolyte solution 24 contains propylene carbonate as the solvent, sulfuric acid ($H_2SO_4$) as a hydrogen ion source, and a neutral material, ferrocene [$Fe(C_5H_5)_2$], as the oxidizing agent.

In addition, a power supply unit 26 is connected via a wire 28 to the conductive light-reflecting film 16 of glass substrate 12 and the electrode film 22 of substrate 17. The power supply unit 26 has a direct current power supply 30 and a switch 32, and when the switch 32 is turned "ON", the minus electrode of the direct current power supply 30 is connected to the conductive light-reflecting film 16 and the plus electrode of direct current power supply 30 to the electrode film 22. The conductive light-reflecting film 16 and the electrode film 22 are able to be short-circuited via a circuit not shown in the Figure.

Hereinafter, operation of the first embodiment will be described.

In the electrochromic mirror 10 having the configuration above, when the switch 32 of power supply unit 26 is turned on "ON", a negative voltage is applied to the conductive light-reflecting film 16 and a positive voltage to the electrode film 22 by the direct current power supply 30. As a result, the hydrogen ions contained in the electrolyte solution 24 penetrated through the hydrogen ion-conductive dielectric film 15 and are converted in the conductive light-reflecting film 16 to hydrogen atoms, which diffuse through the conductive light-reflecting film 16 to the electrochromic film 14. Then in the electrochromic film 14, the following reductive reaction occurs.

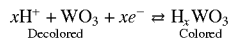
$$x\text{H}^+ + \text{WO}_3 + xe^- \rightleftarrows \underset{\text{Colored}}{\text{H}_x\text{WO}_3}$$
(Decolored)

$H^+$ represents a hydrogen ion, x represents a number in a range of 0 to 0.3, and $e^-$ represents an electron.

At the time, the following oxidation reaction occurs in the electrolyte solution 24 close to the electrode film 22.

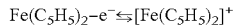
$$\text{Fe}(C_5H_5)_2 - e^- \rightleftarrows [\text{Fe}(C_5H_5)_2]^+$$

Accordingly, the reaction can be expressed as a whole by the following equation.

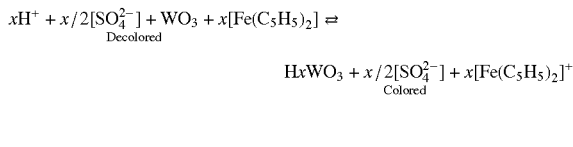
$$x\text{H}^+ + x/2[SO_4^{2-}] + \text{WO}_3 + x[\text{Fe}(C_5H_5)_2] \rightleftarrows$$
(Decolored)
$$\text{H}_x\text{WO}_3 + x/2[SO_4^{2-}] + x[\text{Fe}(C_5H_5)_2]^+$$
(Colored)

Thus, tungsten trioxide ($WO_3$), the material for the electrochromic film 14, develops color. Since the light that enters from the surface of the glass substrate 12 into the glass substrate 12 and is reflected by the light-reflecting layer 16 (see arrow A in FIG. 1) is thereby reduced in intensity by passing through the colored color layer 14, the reflectance of the variable reflectance mirror 10 is changed and an anti-glare effect is achieved.

On the other hand, when the switch 32 of the power supply unit 26 is turned "OFF", i.e., when the voltages applied to the light-reflecting layer 16 and the electrode layer 22 are removed and the light-reflecting layer 16 and the electrode layer 22 are short circuited via a circuit not shown in the Figure, the hydrogen atoms which were reacted to the electrochromic layer 14 return back to the electrolyte solution 24, making tungsten trioxide ($WO_3$), that is the material for the color layer 14, decolor.

Since the electrochromic mirror 10 according to the first embodiment has a hydrogen ion-conductive dielectric film 15 formed between the conductive light-reflecting film 16 and the electrolyte solution 24, the hydrogen ion-conductive dielectric film 15 prohibits contact of the conductive light-reflecting film 16 and the electrolyte solution 24. A corrosion of the conductive light-reflecting film 16 by the electrolyte solution 24 is prevented thereby.

In this manner, the electrochromic mirror 10 according to the first embodiment prevents the corrosion of the conductive light-reflecting film 16 by the electrolyte solution 24.

Other embodiments of the invention will be described below. Codes identical with those used in the first embodiment are assigned to the components and effects which are basically the same with those of the first embodiment and duplication of the description is omitted.

Example 2

Figure 2:
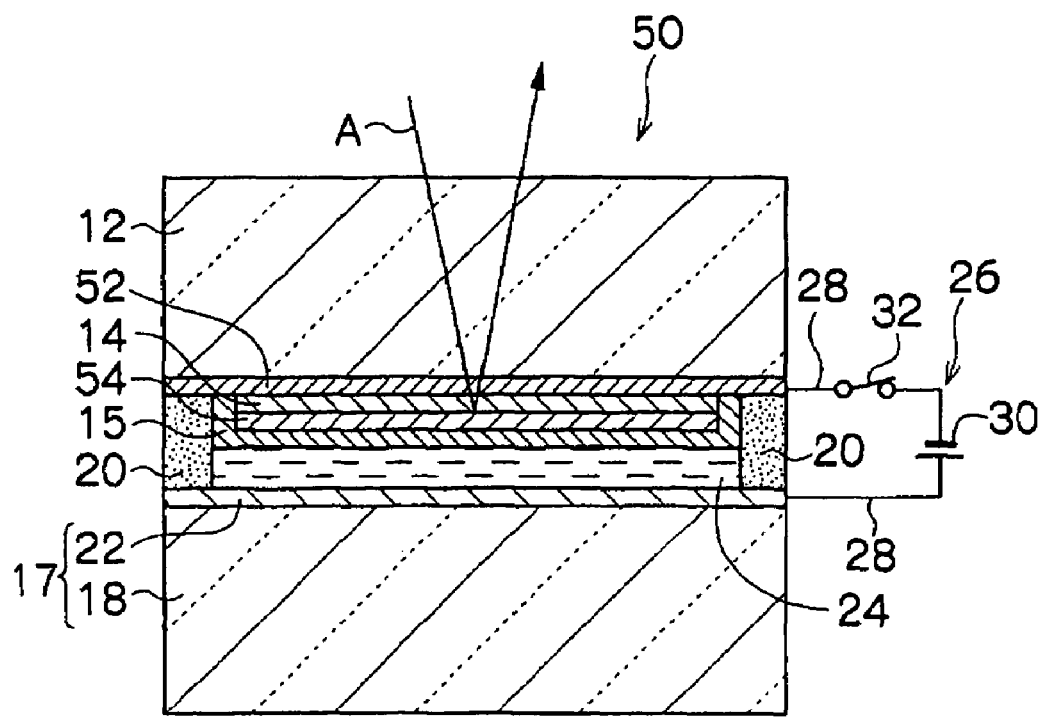
FIG. 2 is a cross-sectional view illustrating the configuration of an electrochromic mirror according to the second embodiment of the invention.

FIG. 2 is a cross-sectional view illustrating the configuration of an electrochromic mirror 50 according to the second embodiment.

As shown in FIG. 2, the electrochromic mirror 50 according to the second embodiment has a configuration fundamentally the same as that of the electrochromic mirror 10 according to the first embodiment, but is different in the following features.

The electrochromic mirror 50 has a glass substrate 12 having a transparent electrode film 52 with electrical conductivity formed as a thin film on the rear face of the glass substrate (bottom surface in FIG. 2) by, for example, means of vacuum deposition. Examples of the material used for the transparent electrode film 52 include tin-doped indium oxide (ITO), fluorine-doped tin oxide ($SnO_2$:F), antimony-doped tin oxide ($SnO_2$:Sb), and the like.

An electrochromic film 14 similar to the electrochromic film 14 according to the first embodiment is formed as a thin film on the face of transparent electrode film 52 opposite to the glass substrate 12, for example, by means of vacuum deposition.

A light-reflecting film 54 allowing transmission of hydrogen atoms is formed as a thin film on the side of the electrochromic film 14 opposite to the transparent electrode film 52, for example, by means of vacuum deposition. A noble metal in the platinum family such as platinum, rhodium, or palladium or alloys containing the same (for example, alloy of silver and a platinum family element), or the like is preferable as the material used for the light-reflecting film 54.

On the side of the light-reflecting film 54 opposite to the electrochromic film 14 a hydrogen ion-conductive dielectric film 15 similar to the hydrogen ion-conductive dielectric film 15 according to the first embodiment is formed as a thin film, for example, by means of vacuum deposition.

In addition, in the electrochromic mirror 50, a minus electrode of the direct current power supply 30 is connected via a switch 32 and a wire 28 to the transparent electrode film 52 of transparent substrate 12, and a plus electrode of direct current power supply 30 is connected via a wire 28 to an electrode film 22 of a substrate 17.

Other components are the same as those for the electrochromic mirror 10 according to the first embodiment.

Operation of the second embodiment will be described below.

In the electrochromic mirror 50 having the configuration above, when the switch 32 of the power supply unit 26 is turned "ON", a negative voltage is applied to transparent electrode film 52 and a positive voltage is applied to the electrode film 22 by the direct current power supply 30. As a result, the hydrogen ions contained in the electrolyte solution 24 penetrate through the hydrogen ion-conductive dielectric film 15 and are converted in the conductive light-reflecting film 54 to hydrogen atoms, which diffuse through the conductive light-reflecting film 54 to the electrochromic film 14. Then in a similar manner to the electrochromic mirror 10 according to the first embodiment, the electrochromic film 14 develops color reductively, changing the reflectance thereof.

In the electrochromic mirror 50 according to the second embodiment, which has a hydrogen ion-conductive dielectric film 15 formed between the light-reflecting film 54 and the electrolyte solution 24, the hydrogen ion-conductive dielectric film 15 prohibits contact between the light-reflecting film 54 and the electrolyte solution 24. Thus, corrosion of the light-reflecting film 54 by the electrolyte solution 24 is prevented.

In this manner, the electrochromic mirror 50 according to the second embodiment prevents the corrosion of the light-reflecting film 54 by the electrolyte solution 24.

Although the electrolyte solution 24 in the first and second embodiments contains hydrogen ions, the electrolytes therein are not limited to hydrogen atoms and may contain lithium ions instead. In such cases, for example, lithium perchlorate ($LiClO_4$), lithium borofluoride ($LiBF_4$), lithium arsenofluoride ($LiAsF_6$), or the like may be used as the lithium ion source.

However, in such cases, a lithium ion-conductive dielectric film of lithium fluoride (LiF), magnesium fluoride ($MgF_2$), aluminum lithium fluoride (LiAlF), or the like is used instead of the hydrogen ion-conductive dielectric film 15 according to the first or second embodiment.

In addition, use of rhodium, which is particularly favorable regarding lithium atom permeability, is preferable as the material for the conductive light-reflecting film 16 according to the first embodiment and the light-reflecting film 54 according to the second embodiment.

The electrochromic mirror 50 having such a configuration can also provide actions and effects fundamentally similar to those of the first and second embodiments.

Example 3

Figure 3:
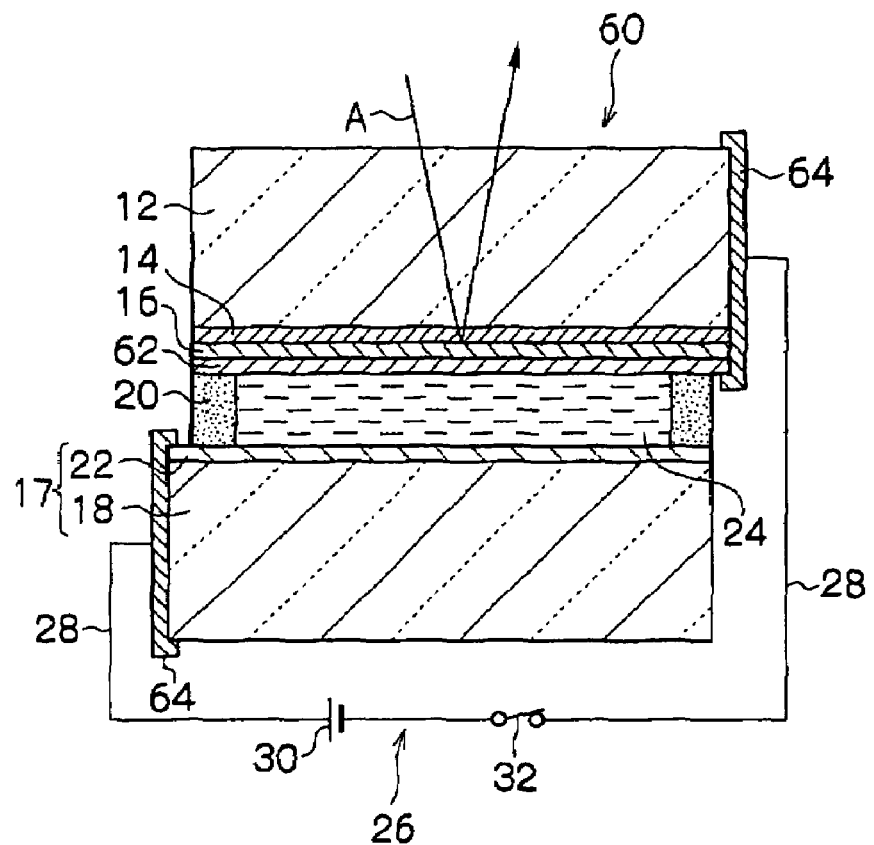
FIG. 3 is a cross-sectional view illustrating the configuration of an electrochromic mirror according to the third embodiment of the invention.
Figure 4:
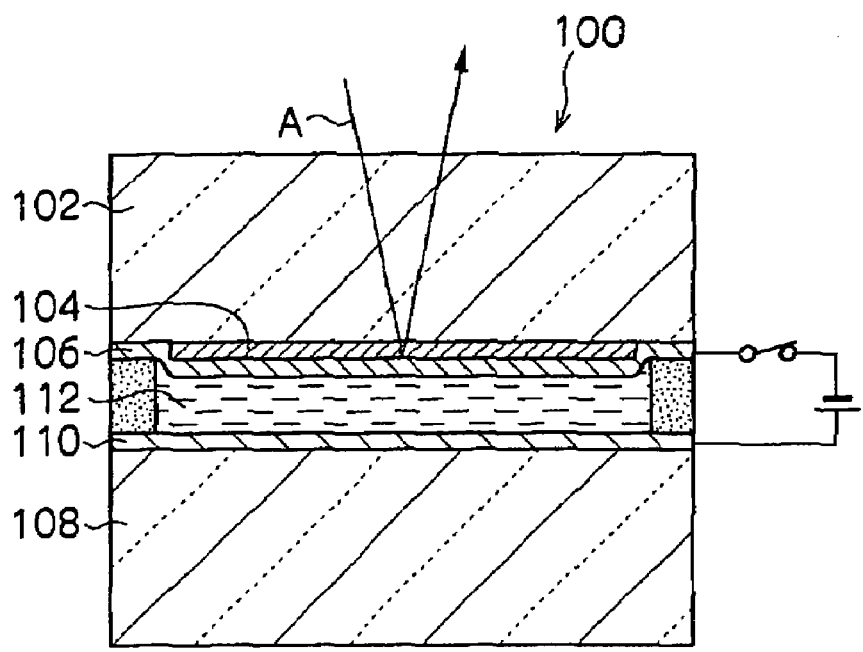
FIG. 4 is a cross-sectional view illustrating the configuration of a conventional electrochromic mirror.

FIG. 3 is a cross-sectional view illustrating the configuration of an electrochromic mirror 60 according to the third embodiment.

As shown in FIG. 3, the electrochromic mirror 60 according to the third embodiment has a configuration fundamentally the same as that of the electrochromic mirror 10, but is different therefrom in the following features.

In the electrochromic mirror 60, a dielectric film 62 having electrical conductivity and hydrogen ion conductivity is formed as a film on the side of conductive light-reflecting film 16 opposite to the electrochromic film 14, for example, by means of vacuum deposition. Favorable examples of the materials used for the dielectric film 62 include tin oxide ($SnO_2$), fluorine-doped tin oxide ($SnO_2$:F), antimony-doped tin oxide ($SnO_2$:Sb), tin-doped indium oxide (ITO), zinc oxide (ZnO), aluminum-doped zinc oxide (ZnO:Al), titanium oxide ($TiO_2$), titanium nitride (TiN), and the like.

In the electrochromic mirror 60, the glass substrate 12 and the substrate 17 are placed slightly displaced in the width direction (in the horizontal direction in FIG. 3) (offset from each other), and one edge of the glass substrate 12 in the width direction (right edge in FIG. 3) is sticking out relative to the position of the substrate 17 and the sealant 20.

A terminal 64 of a metal plate in a U-shape form is connected to the projected area of the glass substrate 12. The terminal 64 is connected to the edge of the dielectric film 62 that is also protruding with the glass substrate 12, and also to the minus electrode of the direct current power supply 30 via wiring 28 and a switch 32.

Likewise, one edge of the substrate 17 in the width direction (left edge in FIG. 3) is sticking out relative to the position of the glass substrate 12 and the sealant 20, and another terminal 64 is connected to the projected area of the substrate 17. The terminal 64 is connected to the electrode film 22 of substrate 17 and to the plus electrode of direct current power supply 30 via a wire 28.

Other components are the same as those for the electrochromic mirror 10 according to the first embodiment.

Hereinafter, operation of the third example will be described.

In the electrochromic mirror 60 having the configuration above, when the switch 32 of power supply unit 26 is turned "ON", a negative voltage is applied to the dielectric film 62 and a positive voltage to the electrode film 22 by the direct current power supply 30. When a negative voltage is applied to the dielectric film 62, a negative voltage is applied via the same dielectric film 62 to the conductive light-reflecting film 16. As a result, the hydrogen ions contained in the electrolyte solution 24 penetrate through the dielectric film 62 and are converted in the conductive light-reflecting film 16 to hydrogen atoms, which diffuse through the conductive light-reflecting film 16 to the electrochromic film 14. Thus, in a similar manner to the electrochromic mirror 10 according to the first embodiment, the electrochromic film 14 develops color reductively, changing the reflectance thereof.

In the electrochromic mirror 60 according to the third embodiment, which has a dielectric film 62 between the conductive light-reflecting film 16 and the electrolyte solution 24, contact between the conductive light-reflecting film 16 and the electrolyte solution 24 is prevented by the dielectric film 62 as described above. In this manner, corrosion of the conductive light-reflecting film 16 by the electrolyte solution 24 is prevented.

In addition, the electrochromic mirror 60 has an electrically conductive dielectric film 62, to which a terminal 64 for voltage application is connected. That is, in the electrochromic mirror 60, the dielectric film 62 plays the role both of a protective film for protecting the conductive light-reflecting film 16 from the electrolyte solution 24 and the role of an electrode film of applying a voltage to the conductive light-reflecting film 16. Such a configuration eliminates troublesome procedures, for example, connecting a wire to the conductive light-reflecting film 16 formed inside the protection film (dielectric film 62) and makes the structure of the electrochromic mirror 60 much simpler.

As described above, the electrochromic mirror 60 according to the third embodiment prevents corrosion of the conductive light-reflecting film 16 by the electrolyte solution 24.

In the first to third examples, sulfuric acid is used as the hydrogen ion source contained in the electrolyte solution 24, but the hydrogen ion source used is not limited thereto. Any one of common acids, such as hydrochloric acid, phosphoric acid, acetic acid, oxalic acid, formic acid, and perchloric acid, may be used as the hydrogen ion source contained in the electrolyte solution 24 source.

In addition, ferrocene ($Fe(C_5H_5)_2$), an iron-containing compound, is used as the neutral molecule (neutral material) contained in the electrolyte solution 24 in the first to third embodiments, but the neutral compound used is not limited to ferrocene. Any one of so-called metallocene compounds may be used as the neutral molecule (neutral material) contained in the electrolyte solution 24.

Further, the electrolyte solution 24 used in the first to third examples is a solution containing sulfuric acid ($H_2SO_4$) as a hydrogen ion source and a neutral material, ferrocene [$Fe(C_5H_5)_2$], as the oxidizing agent in a solvent, propylene carbonate; but the electrolyte solution used in the invention is not limited thereto, and may contain ferrocyanic acid ($H_4[Fe(CN)_6]$) instead of the sulfuric acid ($H_2SO_4$) and ferrocene [$Fe(C_5H_5)_2$].

Alternatively, the electrolyte solution 24 may contain water as the solvent and potassium ferrocyanate ($K_4[Fe(CN)_6]$) as the electrolyte. In such a case, hydrogen ions of water are used as the hydrogen ions contained in the electrolyte solution 24.

Further, the material used for the electrochromic film 14 is tungsten trioxide ($WO_3$) in the first to third embodiments; but the material is not limited thereto and molybdenum trioxide ($MoO_3$) or a mixture containing at least one of tungsten trioxide ($WO_3$) and molybdenum trioxide ($MoO_3$) is preferably used as the material for the electrochromic film 14.

In the first to third embodiments, it becomes possible to prevent leakage of the electrolyte solution when the electrochromic mirror 10, 50, or 60 is damaged, if the electrolyte solution 24 is gelated by adding an acrylic resin to the electrolyte solution 24.

In the first to third embodiments, it becomes also possible to prevent leakage of the electrolyte solution when the electrochromic mirror 10, 50, or 60 is damaged, if the electrolyte solution 24 is gelated by adding silica to the electrolyte solution 24.

What is claimed is:

1. An electrochromic mirror, comprising
    a transparent substrate;
    an electrochromic film, that reductively develops color, and has the transparent substrate on or above a surface thereof;
    a light-reflecting film, that allows transmission of hydrogen atoms or lithium atoms, and is formed on a side of the electrochromic film that is opposite to a side provided with the transparent substrate;
    a substrate having an electrically conductive area on at least one surface that faces the light-reflecting film; and
    an electrolyte solution that comprises hydrogen ions and an oxidizable material containing neutral molecules or negative ions and that is sealed between the light-reflecting film and the conductive area of the substrate, wherein
    (i) the light-reflecting film has electrical conductivity, or,
    (ii) a transparent electrode film having electrical conductivity is formed between the transparent substrate and the electrochromic film,
    further comprising a dielectric film that has hydrogen ion conductivity or lithium ion conductivity and is formed between the light-reflecting film and the electrolyte solution to protect said light-reflecting film from corrosion by said electrolyte solution.

2. The electrochromic mirror according to claim 1, wherein:
    the light-reflecting film allows transmission of hydrogen atoms and has electrical conductivity; and
    the dielectric film has hydrogen ion conductivity.

3. The electrochromic mirror according to claim 2, wherein the dielectric film comprises at least one selected from the group consisting of silicon dioxide, magnesium fluoride, and tantalum pentoxide.

4. The electrochromic mirror according to claim 1, wherein:
    the transparent electrode film having electrical conductivity is formed between the transparent substrate and the electrochromic film; and
    the dielectric film has hydrogen ion conductivity.

5. The electrochromic mirror according to claim 4, wherein the dielectric film comprises at least one selected from the group consisting of silicon dioxide, magnesium fluoride, and tantalum pentoxide.

6. The electrochromic mirror according to claim 1, wherein:
    the light-reflecting film allows transmission of lithium atoms and has electrical conductivity; and
    the dielectric film has lithium ion conductivity.

7. The electrochromic mirror according to claim 6, wherein the dielectric film comprises at least one selected from the group consisting of lithium fluoride, magnesium fluoride, and aluminum lithium fluoride.

8. The electrochromic mirror according to claim 1, wherein:
    the transparent electrode film having electrical conductivity is formed between the transparent substrate and the electrochromic film; and
    the dielectric film has lithium ion conductivity.

9. The electrochromic mirror according to claim 8, wherein the dielectric film comprises at least one selected from the group consisting of lithium fluoride, magnesium fluoride, and aluminum lithium fluoride.

10. The electrochromic mirror according to claim 1, wherein:
    the light-reflecting film allows transmission of hydrogen atoms and has electrical conductivity; and
    the dielectric film has electrical conductivity and hydrogen ion conductivity.

11. The electrochromic mirror according to claim 10, wherein the dielectric film comprises at least one selected from the group consisting of tin oxide, fluorine-doped tin oxide, antimony-doped tin oxide, tin-doped indium oxide, zinc oxide, aluminum-doped zinc oxide, titanium oxide, and titanium nitride.

* * * * *